US011949181B2

(12) United States Patent
Chen et al.

(10) Patent No.: US 11,949,181 B2
(45) Date of Patent: Apr. 2, 2024

(54) ELECTRICAL CONNECTOR WITH IMPROVED STRUCTURAL RELIABILITY

(71) Applicant: DONGGUAN LUXSHARE TECHNOLOGIES CO., LTD, Dongguan (CN)

(72) Inventors: Maoshan Chen, Dongguan (CN); Hongji Chen, Dongguan (CN)

(73) Assignee: DONGGUAN LUXSHARE TECHNOLOGIES CO., LTD, Dongguan (CN)

(*) Notice: Subject to any disclaimer, the term of this patent is extended or adjusted under 35 U.S.C. 154(b) by 172 days.

(21) Appl. No.: 17/728,163

(22) Filed: Apr. 25, 2022

(65) Prior Publication Data

US 2022/0352667 A1 Nov. 3, 2022

(30) Foreign Application Priority Data

Apr. 28, 2021 (CN) ........................ 202120901625.0

(51) Int. Cl.
*H01R 13/424* (2006.01)

(52) U.S. Cl.
CPC .................................. *H01R 13/424* (2013.01)

(58) Field of Classification Search
CPC .............................. H01R 13/424; H01R 13/40
See application file for complete search history.

(56) References Cited

U.S. PATENT DOCUMENTS

| | | | | |
|---|---|---|---|---|
| 9,531,130 | B1 * | 12/2016 | Phillips | H01R 13/6471 |
| 9,768,557 | B2 * | 9/2017 | Phillips | H01R 13/6585 |
| 10,128,620 | B1 * | 11/2018 | Wu | H01R 13/405 |
| 11,258,206 | B2 * | 2/2022 | He | H01R 13/6586 |
| 11,271,337 | B2 * | 3/2022 | Huang | H01R 12/7052 |
| 11,303,056 | B2 * | 4/2022 | Huang | H01R 13/6599 |
| 11,316,304 | B2 * | 4/2022 | Chen | H01R 13/40 |
| 2019/0267760 | A1 * | 8/2019 | Chen | H01R 24/60 |
| 2021/0075159 | A1 * | 3/2021 | Wang | H01R 13/6582 |
| 2021/0075164 | A1 | 3/2021 | Chen et al. | |

* cited by examiner

*Primary Examiner* — Harshad C Patel
(74) *Attorney, Agent, or Firm* — Birch, Stewart, Kolasch & Birch

(57) ABSTRACT

An electrical connector includes an insulating body, a first terminal module, and a second terminal module. The first terminal module includes a first insulating block and a first conductive terminal. The first conductive terminal includes a first mating portion. The second terminal module includes a second insulating block and a second conductive terminal. The second conductive terminal includes a second mating portion. The first conductive terminal includes a supporting portion exposed from the first insulating block. The electrical connector further includes a supporting block located behind the supporting portion along a mating direction and abutting against the supporting portion. The present disclosure improves the structural reliability of the electrical connector and facilitates miniaturization of the electrical connector.

15 Claims, 13 Drawing Sheets

ELECTRICAL CONNECTOR WITH IMPROVED STRUCTURAL RELIABILITY

CROSS-REFERENCE TO RELATED APPLICATION

This patent application claims priority of a Chinese Patent Application No. 202120901625.0, filed on Apr. 28, 2021 and titled "ELECTRICAL CONNECTOR", the entire content of which is incorporated herein by reference.

TECHNICAL FIELD

The present disclosure relates to an electrical connector, which belongs to a technical field of connectors.

BACKGROUND

An existing electrical connector includes an insulating body and a plurality of terminal modules installed to the insulating body. The plurality of terminal modules include a first terminal module and a second terminal module. The first terminal module usually includes a first insulating block and a plurality of first conductive terminals. The second terminal module usually includes a second insulating block and a plurality of second conductive terminals. Each first conductive terminal usually includes a first fixing portion insert-molded with the first insulating block, a first elastic arm extending from the first fixing portion, and a first fixing leg extending from the first fixing portion.

In order to improve the structural strength of the first conductive terminal so as to improve the reliability when mated with a mating module, a portion of the first fixing portion of the first conductive terminal embedded in the first insulating block is usually designed to be longer. The problem brought by this design is that the overall length of the first insulating block is relatively long, which is not beneficial to miniaturization of the electrical connector.

SUMMARY

An object of the present disclosure is to provide an electrical connector with high structural reliability and easy to realize miniaturization.

In order to achieve the above object, the present disclosure adopts the following technical solution: an electrical connector, including: an insulating body, the insulating body including a first wall portion, a second wall portion, and a mating slot located between the first wall portion and the second wall portion; a first terminal module, the first terminal module being at least partially received in the insulating body, the first terminal module including a first insulating block and a plurality of first conductive terminals fixed to the first insulating block, at least one of the first conductive terminals including a first elastic arm, the first elastic arm including a first mating portion and a first end portion connected to the first mating portion, the first mating portion protruding into the mating slot; and a second terminal module, the second terminal module being at least partially received in the insulating body, the second terminal module including a second insulating block and a plurality of second conductive terminals fixed to the second insulating block, at least one of the second conductive terminals including a second elastic arm, the second elastic arm including a second mating portion and a second end portion connected to the second mating portion, the second mating portion protrudes into the mating slot; wherein the first insulating block defines a receiving groove, and the second end portion is received in the receiving groove; and wherein at least one of the first conductive terminals includes a supporting portion extending from the first elastic arm, the supporting portion is exposed from the first insulating block, the electrical connector further includes a supporting block located behind the supporting portion along a mating direction and abutting against the supporting portion.

Compared with the prior art, at least one of the first conductive terminals disclosed in the present disclosure includes the supporting portion. The supporting portion is exposed from the first insulating block, thereby shortening the length of the first insulating block. The electrical connector further includes a supporting block located behind the supporting portion along the mating direction and abutting against the supporting portion. By providing the supporting block, the structural reliability of the first conductive terminal is improved. In addition, by providing the receiving groove in the first insulating block and receiving the second end portion in the receiving groove, the reliability of the second elastic arm is improved, and the risk of damage to the second elastic arm is reduced.

DETAILED DESCRIPTION

Figure 1:
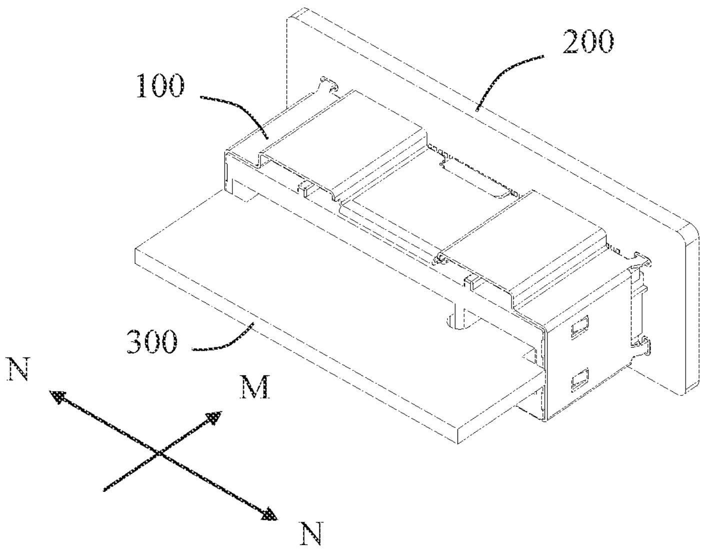
FIG. 1 is a perspective schematic view of an electrical connector in accordance with an embodiment of the present disclosure when it is mounted on a circuit board and mated with a mating module.
Figure 2:
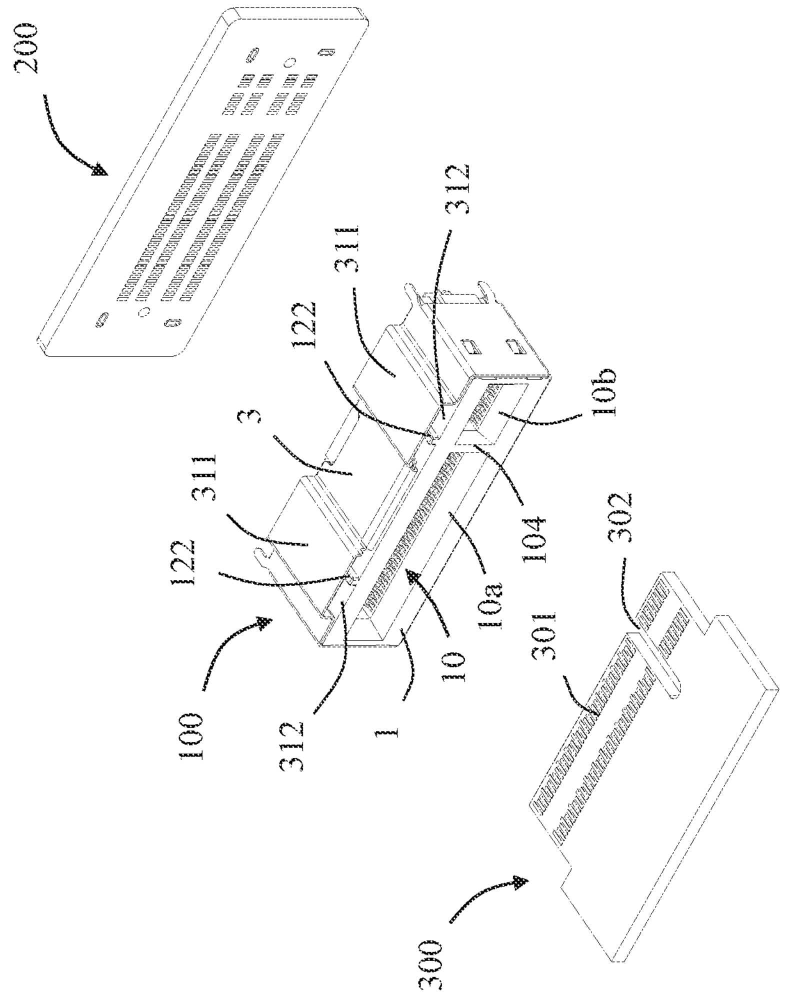
FIG. 2 is a partially exploded perspective view of FIG. 1.
Figure 3:
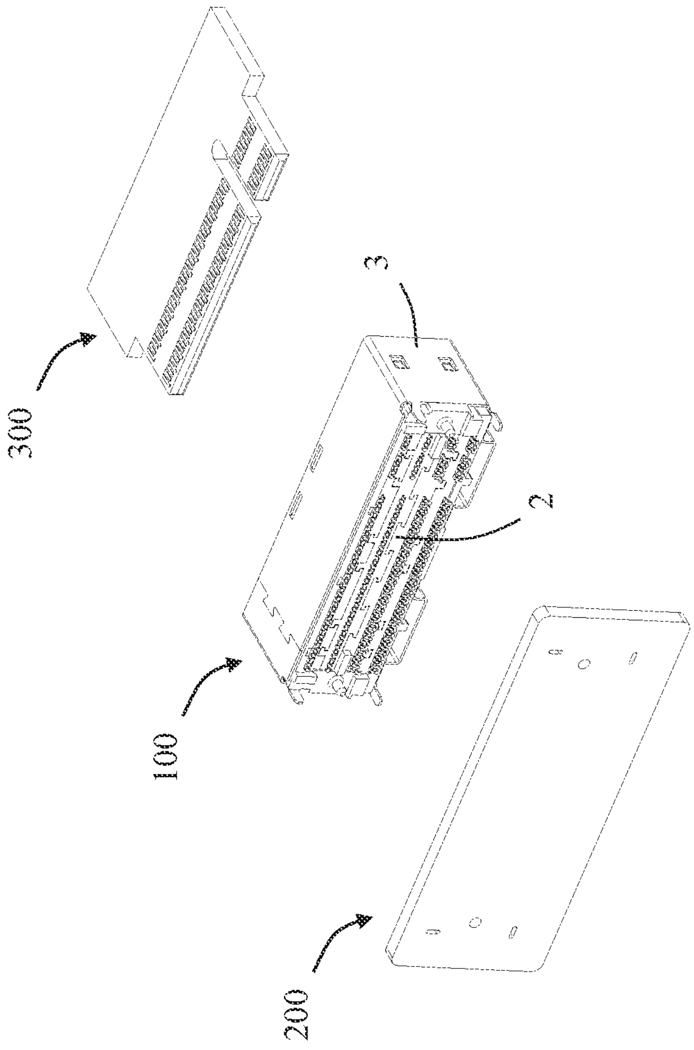
FIG. 3 is a partially exploded perspective view of FIG. 2 from another angle.
Figure 4:
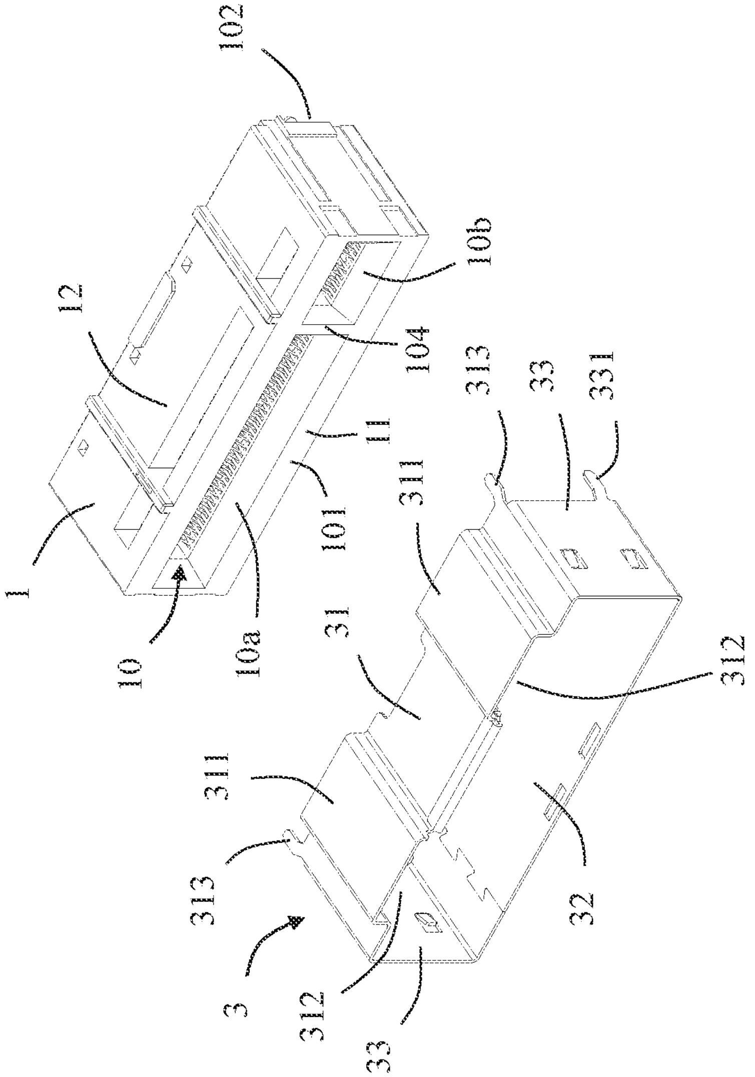
FIG. 4 is a partial perspective exploded view of the electrical connector in an embodiment of the present disclosure.
Figure 5:
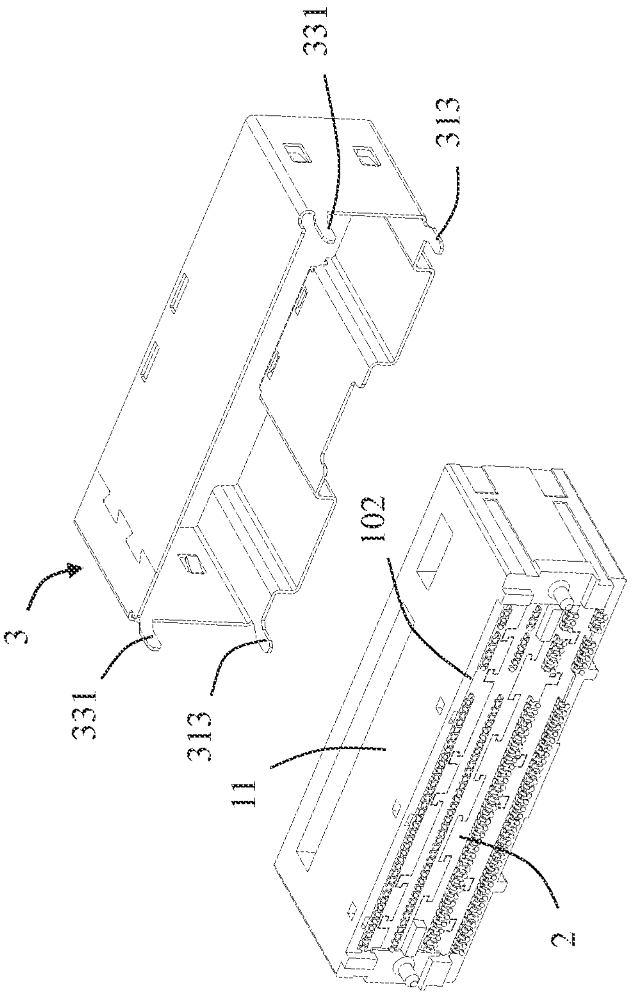
FIG. 5 is a partial perspective exploded view of FIG. 4 from another angle.
Figure 6:
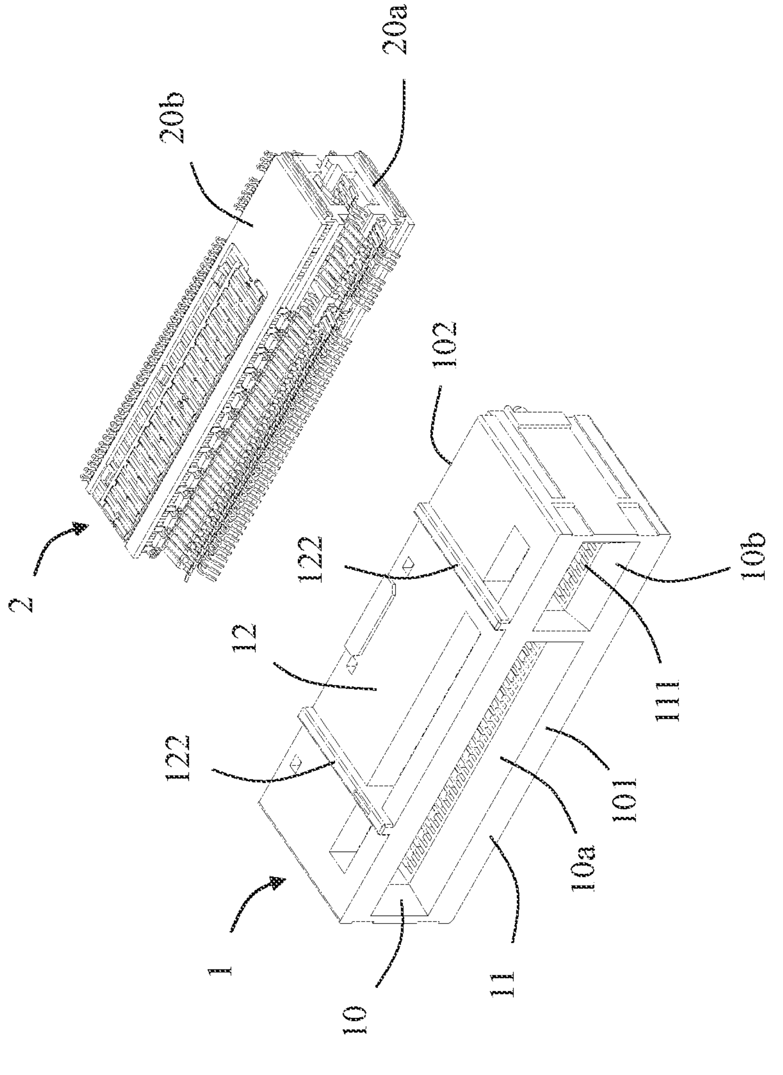
FIG. 6 is a further perspective exploded view after removing a metal shell in FIG. 4, in which a terminal module is separated.
Figure 7:
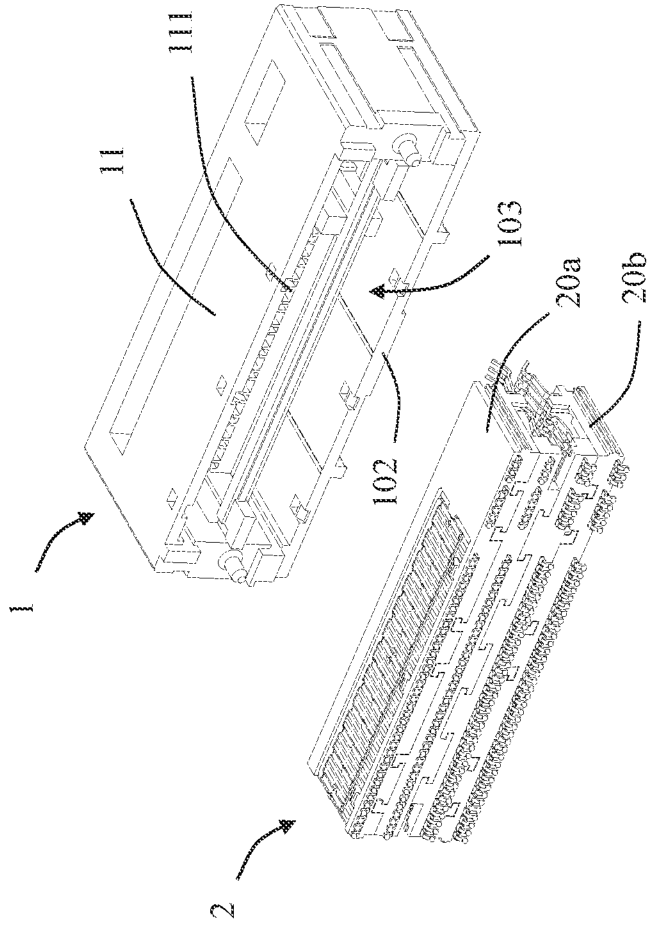
FIG. 7 is a perspective exploded view of FIG. 6 from another angle.
Figure 8:
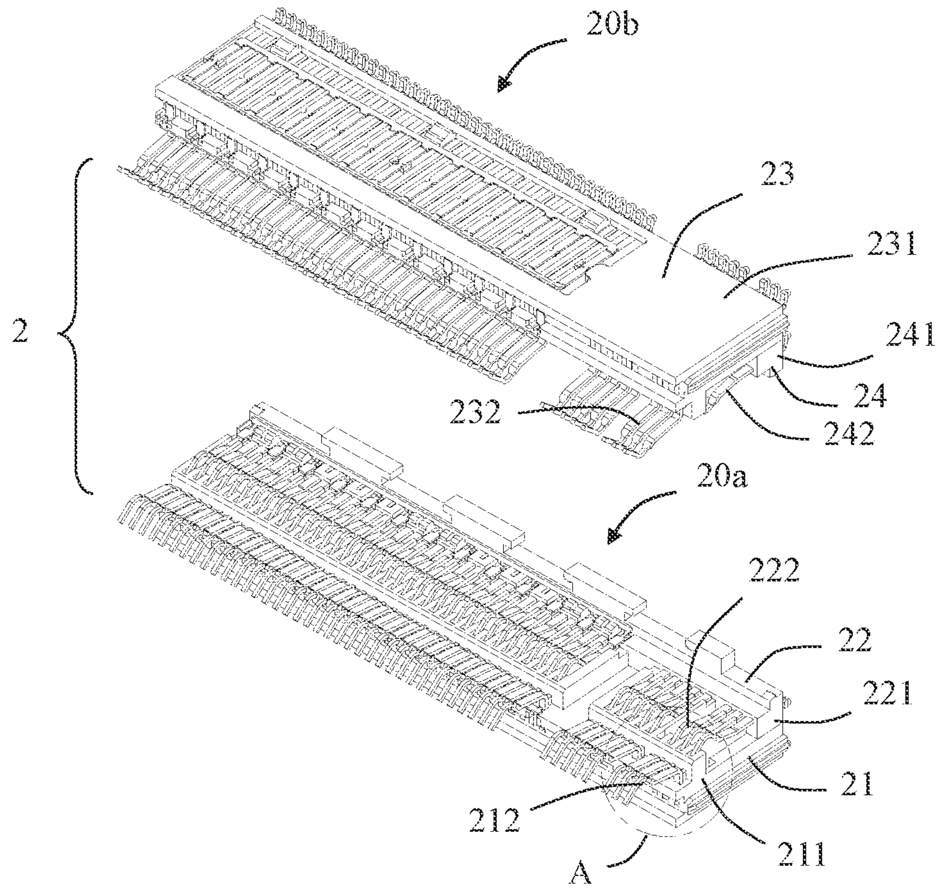
FIG. 8 is a perspective schematic view when a first module and a second module are separated from each other.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIGS. 1 to 7, the present disclosure discloses an electrical connector 100 which is adapted to be mounted to a circuit board 200 and adapted to mate with a mating module 300. The mating module 300 is inserted into the electrical connector 100 along a mating direction M (for example, a front-to-rear direction in FIG. 1). The circuit board 200 is perpendicular to the mating direction M. In the illustrated embodiment of the present disclosure, the electrical connector 100 is a card edge connector. The mating module 300 is an electronic card. The electronic card is provided with a plurality of golden fingers 301 on upper and lower surfaces, and a notch 302. Of course, it is understandable to those skilled in the art that the electrical connector 100 may also be other types of connectors. Correspondingly, the mating module 300 may also be other components. For example, the mating module 300 may be a plug connector which matches with the electrical connector 100. The plug connector includes a tongue plate with golden fingers. The tongue plate is adapted to be inserted into the electrical connector 100 so as to achieve electrical connection.

The electrical connector 100 includes an insulating body 1, a terminal module 2 at least partially received in the insulating body 1, and a metal shell 3 enclosing the insulating body 1.

Referring to FIGS. 4 to 7, in the illustrated embodiment of the present disclosure, the insulating body 1 includes a first wall portion 11 (i.e., a bottom wall), a second wall portion 12 (i.e., a top wall), and a mating slot 10 located between the first wall portion 11 and the second wall portion 12. The mating slot 10 is adapted for receiving the mating module 300 along the mating direction M.

The insulating body 1 includes a mating surface 101 and a mounting surface 102. In the illustrated embodiment of the present disclosure, the mating surface 101 is located at a front end, and the mounting surface 102 is located at a rear end. The mating slot 10 extends forwardly through the mating surface 101. The insulating housing 1 further includes an installation space 103 extending backwardly through the mounting surface 102. The electrical connector 100 includes a spacer 104 which divides the mating slot 10 into a first mating slot **10*a* and a second mating slot 10*b* with different widths, so as to play a certain degree of foolproof function. In the illustrated embodiment of the present disclosure, the spacer 104 and the insulating body 1 are integrally formed. The spacer 104 is connected between the first wall portion 11 and the second wall portion 12. Of course, in other embodiments, the spacer 104 can also be provided separately from the insulating body 1. The spacer 104 may be metal or plastic. The spacer 104 is adapted to be received in the notch 302 of the mating module 300**.

The first wall portion 11 includes a plurality of first positioning grooves 111 communicating with the mating slot 10. The first positioning grooves 111 are arranged side by side along a transverse direction N-N (i.e., a left-right direction) perpendicular to the mating direction M. The first positioning grooves Ill do not extend forwardly through the mating surface 101.

Similarly, the second wall portion 12 includes a plurality of second positioning grooves (not shown) communicating with the mating slot 10. The second positioning grooves are arranged side by side along the transverse direction N-N. The second positioning grooves do not extend forwardly through the mating surface 101. In addition, the second wall portion 12 further includes a guiding bar 122 protruding upwardly, and the guiding bar 122 extends along the mating direction M.

The metal shell 3 is roughly sleeve-shaped and includes a top wall 31, a bottom wall 32 and two side walls 33. The top wall 31 includes a raised portion 311 and a cavity 312 located in the raised portion 311. Referring to FIG. 1, the guiding bar 122 protrudes into the cavity 312 so as to guide a plug connector which matches with the electrical connector 100. The top wall 31 is provided with a plurality of first mounting feet 313 extending backwardly. Each side wall 33 includes a second mounting foot 331 extending backwardly. The first mounting feet 313 are perpendicular to the second mounting foot 331. The first mounting feet 313 and the second mounting foot 331 are adapted for being soldered or welded to the circuit board 200.

Referring to FIGS. 8 to 13, the terminal module 2 includes a lower terminal module **20*a* and an upper terminal module 20*b*. The lower terminal module 20*a* and the upper terminal module 20*b* are provided with a protrusion and a groove which are mutually matched with each other, so that the lower terminal module 20*a* and the upper terminal module 20*b* do not loosen after being assembled. In an embodiment of the present disclosure, the lower terminal module 20*a* and the upper terminal module 20*b* are inserted into the installation space 103 of the insulating housing 1** as a whole after assembly.

Specifically, in the illustrated embodiment of the present disclosure, the lower terminal module **20*a* includes a first terminal module 21 and a second terminal module 22. The first terminal module 21 and the second terminal module 22 are at least partially received in the insulating body 1. The first terminal module 21 includes a first insulating block 211 and a plurality of first conductive terminals 212 fixed to the first insulating block 211. In an embodiment of the present disclosure, the first conductive terminals 212 are insert-molded with the first insulating block 211. Of course, in other embodiments, the first conductive terminals 212 may also be fixed to the first insulating block 211** by means of assembly or the like.

The first insulating block 211 includes a plurality of receiving grooves 2111 and a plurality of partitions 2112. The receiving grooves 2111 are arranged side by side along the transverse direction N-N. The partitions 2112 are arranged at intervals along the transverse direction N-N.

In the illustrated embodiment of the present disclosure, each of the first conductive terminals 212 includes a first elastic arm 2121, a supporting portion 2122 extending from the first elastic arm 2121, and a first fixing tail 2123. The first elastic arm 2121 has a first mating portion 2121*a* and a first end portion 2121*b* connected to the first mating portion 2121*a*. The first mating portion 2121*a* and the first end portion 2121*b* protrude forwardly beyond the first insulating block 211. The first end portion 2121*b* is received in a corresponding first positioning groove 111. That is, the first end portion 2121*b* is hidden in the first wall portion 11. This arrangement can prevent the mating module 300 from being inserted into a bottom side of the first end portion 2121*b*, thereby damaging the first elastic arm 2121.

The first mating portion 2121*a* protrudes upwardly into the mating slot 10 to be electrically connected with the mating module 300. The first fixing tails 2123 are adapted for being soldered or welded to the circuit board 200. In the illustrated embodiment of the present disclosure, the first fixing tails 2123 are soldered or welded to the circuit board 200 by solder balls or welding devices.

In the illustrated embodiment of the present disclosure, the supporting portion 2122 is exposed from the first insulating block 211. This arrangement shortens the length of the first insulating block 211 that needs to cover the first conductive terminals 212, which is beneficial to the miniaturization of the electrical connector 100. The electrical connector 100 further includes a supporting block 4 located behind the supporting portion 2122 along the mating direction M and abutting against the supporting portion 2122. In the illustrated embodiment of the present disclosure, the supporting block 4 and the first insulating block 211 are integrally formed to save cost and improve reliability. Of course, in other embodiments, the supporting block 4 can also be arranged separately from the first insulating block 211, and the supporting block 4 is fixed to the first insulating block 211.

Figure 9:
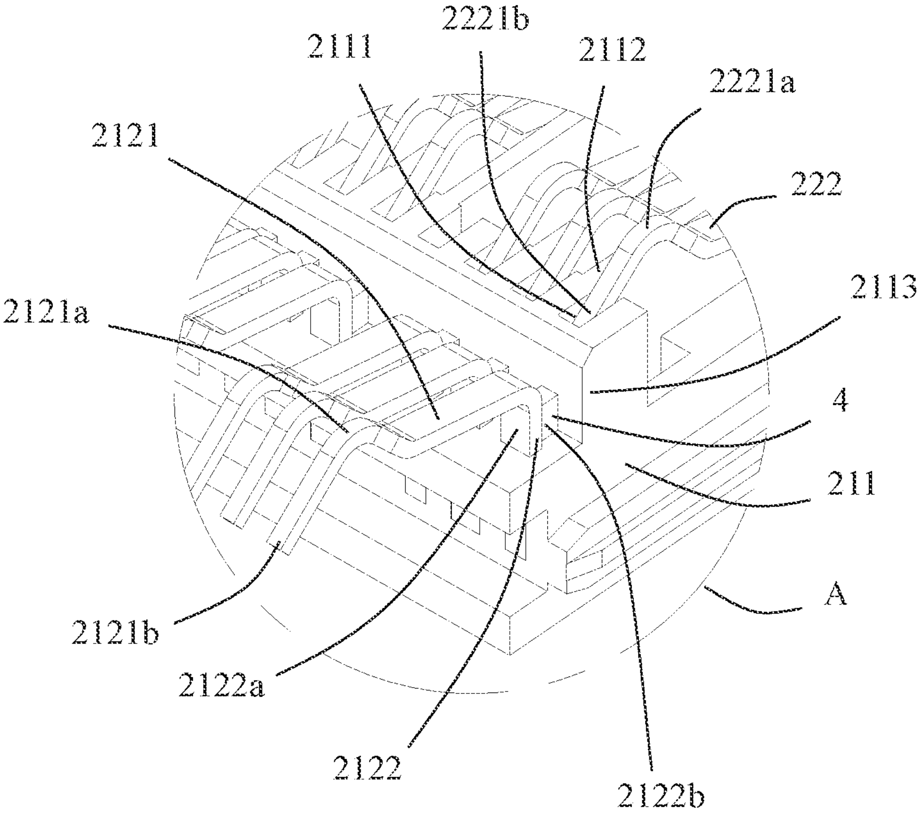
FIG. 9 is a partial enlarged view of a circled part A in FIG. 8.

Specifically, the supporting portion 2122 is formed by bending the first elastic arm 2121. The supporting portion 2122 includes a first end surface 2122*a* (i.e., a front end surface) disposed along the mating direction M and a second end surface 2122*b* (i.e., a rear end surface) opposite to the first end surface 2122*a*. The first end surface 2122*a* is exposed from the first insulating block 211. The supporting block 4 abuts against the second end surface 2122*b*. Compared with the prior art, when the first insulating block 211 is shortened in the present disclosure, by setting the supporting block 4 to limit the first elastic arm 2121, it is possible to avoid improper squeezing of the first conductive terminal 212 when the mating module 300 is inserted. This configuration improves the structural reliability of the first conductive terminal 212. The first end surface 2122*a* and the second end surface 2122*b* of the supporting portion 2122 are both perpendicular to the mating direction M. Referring to FIG. 9, the first insulating block 211 is further provided with a partition wall 2113 extending along the transverse direction N-N. The plurality of partitions 2112 are connected to the partition wall 2113 and extend along the mating direction M. One side of the supporting block 4 abuts against the supporting portion 2122, and the other side of the supporting block 4 abuts against the partition wall 2113. This arrangement is beneficial to improve the structural strength of the first insulating block 211.

The second terminal module 22 includes a second insulating block 221 and a plurality of second conductive terminals 222 fixed to the second insulating block 221. In an embodiment of the present disclosure, the second conductive terminals 222 are insert-molded with the second insulating block 221. Of course, in other embodiments, the second conductive terminals 222 may also be fixed to the second insulating block 221 by means of assembly or the like.

In the illustrated embodiment of the present disclosure, each of the second conductive terminals 222 includes a second elastic arm 2221 and a second fixing tail 2223 extending from the second insulating block 221. The second elastic arm 2221 includes a second mating portion 2221*a* and a second end portion 2221*b* connected to the second mating portion 2221*a*. The second end portion 2221*b* is received in the receiving groove 2111. The second mating portion 2221*a* protrudes upwardly into the mating slot 10 to be electrically connected with the mating module 300. Two adjacent second elastic arms 2221 along the transverse direction N-N are separated by one partition 2112 located between the two second elastic arms 2221. The second fixing tails 2223 are adapted for being soldered or welded with the circuit board 200. In the illustrated embodiment of the present disclosure, the second fixing tails 2223 are soldered or welded to the circuit board 200 by solder balls or welding devices.

The first mating portions 2121*a* are arranged in a first row, and the second mating portions 2221*a* are arranged in a second row parallel to the first row. The first elastic arms 2121 and the second elastic arms 2221 are arranged in a front-to-back alignment along the mating direction M.

Figure 10:
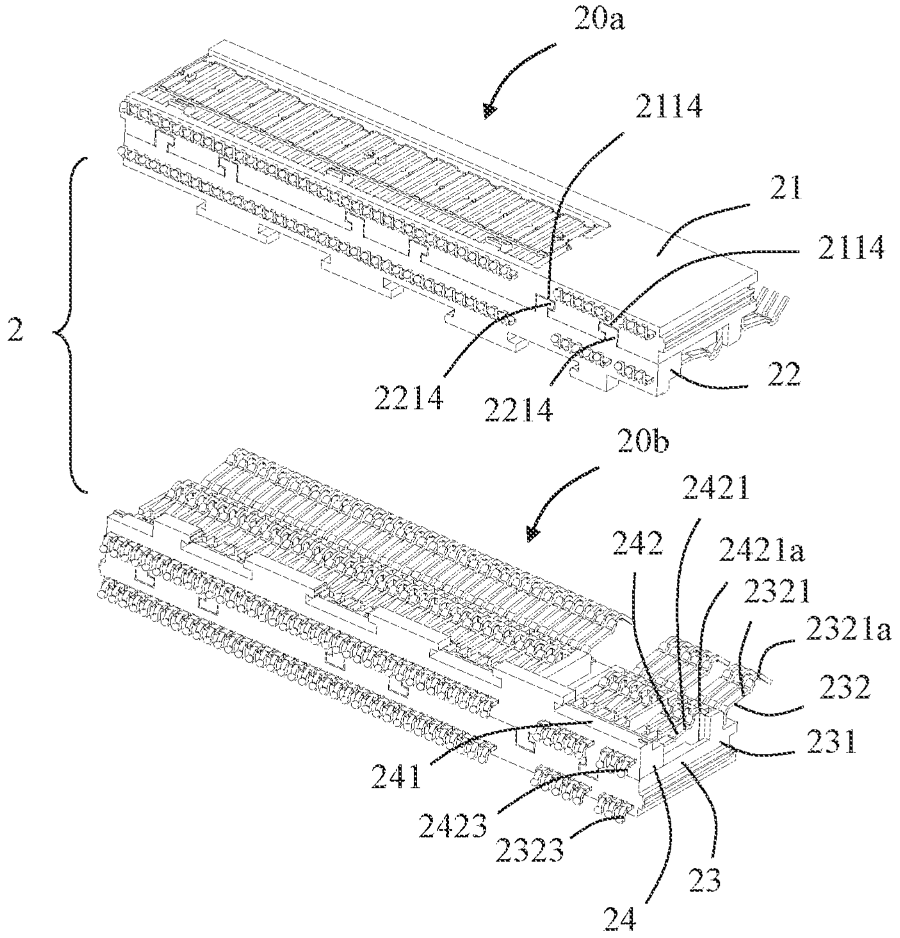
FIG. 10 is a perspective schematic view of FIG. 8 from another angle.
Figure 11:
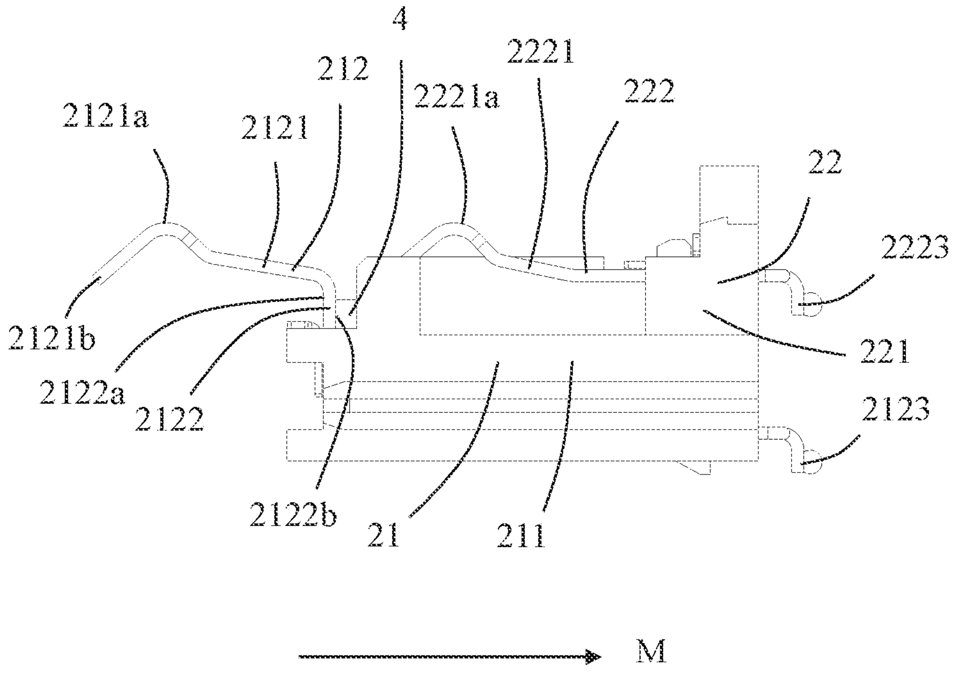
FIG. 11 is a side view of the first module in FIG. 8.
Figure 12:
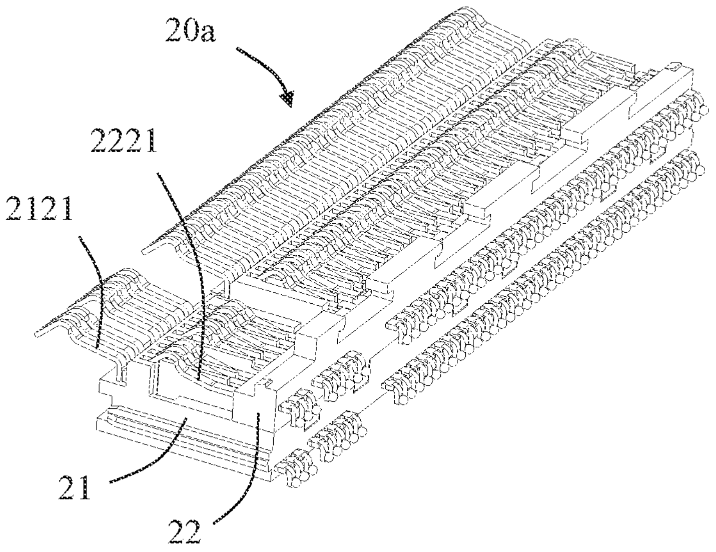
FIG. 12 is a perspective schematic view of the first module in FIG. 8 from another angle.
Figure 13:
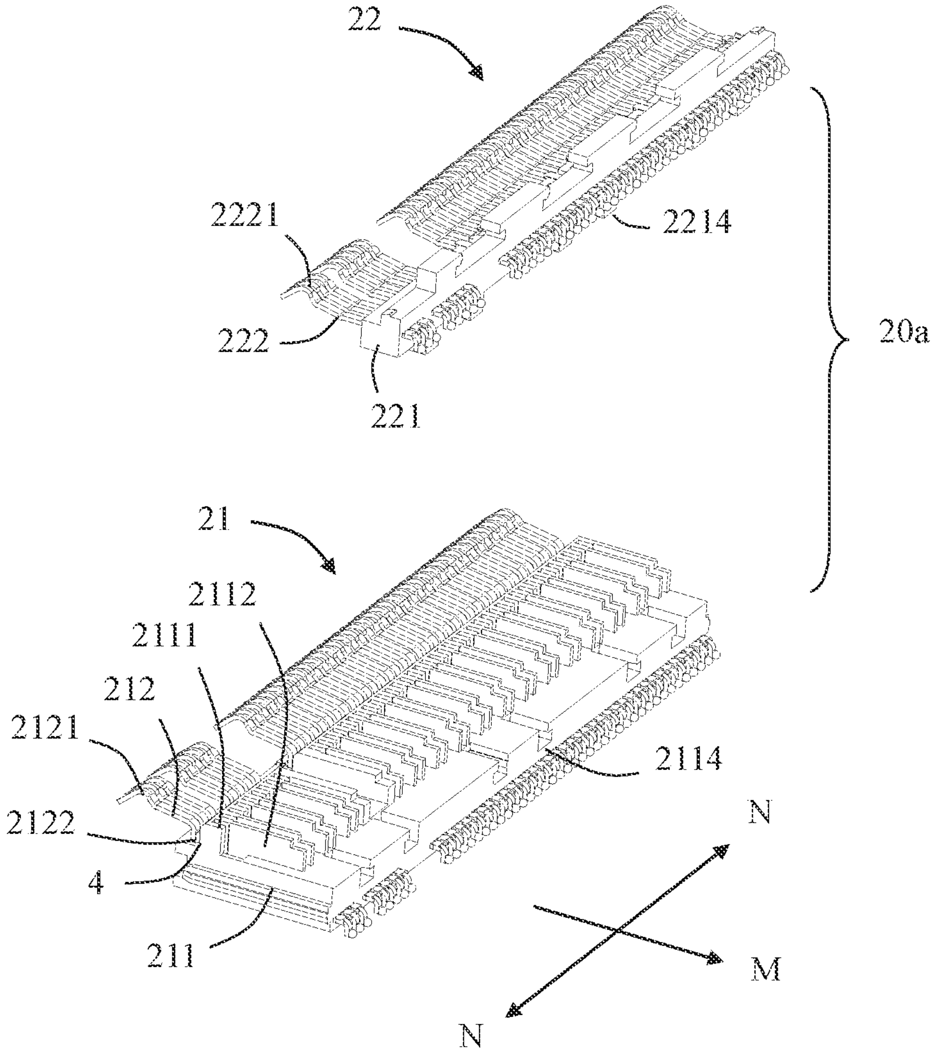
FIG. 13 is a perspective exploded view of FIG. 12, in which the first terminal module and the second terminal module are separated from each other.

The first terminal module 21 and the second terminal module 22 are assembled with each other along an installation direction parallel to the mating direction M. The first insulating block 211 and the second insulating block 221 are provided with a groove 2114 and a protrusion 2214 which are mutually matched with each other so as to prevent the first terminal module 21 and the second terminal module 22 from being separated from each other in a direction (i.e., a vertical direction) perpendicular to the mating direction M. Referring to FIG. 10, a plurality of the grooves 2114 are provided. At least two of the grooves 2114 are L-shaped with opposite directions. A plurality of the protrusions 2214 are provided. At least two of the protrusions 2214 are L-shaped in opposite directions. This design is beneficial to reduce the risk of improper separation of the first terminal module 21 and the second terminal module 22 after assembly.

The upper terminal module 20*b* and the lower terminal module 20*a* are symmetrically arranged on opposite sides of the mating slot 10. Preferably, the upper terminal module 20*b* and the lower terminal module 20*a* can be shared so as to save costs.

Specifically, in the illustrated embodiment of the present disclosure, the upper terminal module 20*b* includes a third terminal module 23 and a fourth terminal module 24. The third terminal module 23 includes a third insulating block 231 and a plurality of third conductive terminals 232 fixed to the third insulating block 231. In an embodiment of the present disclosure, the third conductive terminals 232 are insert-molded with the third insulating block 231. Of course, in other embodiments, the third conductive terminals 232 may also be fixed to the third insulating block 231 by means of assembly or the like.

In the illustrated embodiment of the present disclosure, each of the third conductive terminals 232 includes a third elastic arm 2321 and a third fixing tail 2323. The third elastic arm 2321 includes a third mating portion 2321*a*. The third mating portion 2321*a* protrudes downwardly into the mating slot 10 to be electrically connected with the mating module 300.

The fourth terminal module 24 includes a fourth insulating block 241 and a plurality of fourth conductive terminals 242 fixed to the fourth insulating block 241. In an embodiment of the present disclosure, the fourth conductive terminals 242 are insert-molded with the fourth insulating block 241. Of course, in other embodiments, the fourth conductive terminals 242 may also be fixed to the fourth insulating block 241 by means of assembly or the like.

In the illustrated embodiment of the present disclosure, each of the fourth conductive terminals 242 includes a fourth elastic arm 2421 and a fourth fixing tail 2423. The fourth elastic arm 2421 includes a fourth mating portion 2421*a*. The fourth mating portion 2421*a* protrudes downwardly into the mating slot 10 to be electrically connected with the mating module 300.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector, comprising:
- an insulating body, comprising a first wall portion, a second wall portion, and a mating slot located between the first wall portion and the second wall portion;
- a first terminal module, at least partially received in the insulating body, the first terminal module comprising a first insulating block and a plurality of first conductive terminals fixed to the first insulating block, at least one of the first conductive terminals comprising a first elastic arm, the first elastic arm comprising a first mating portion and a first end portion connected to the first mating portion, the first mating portion protruding into the mating slot; and
- a second terminal module, at least partially received in the insulating body, the second terminal module comprising a second insulating block and a plurality of second conductive terminals fixed to the second insulating block, at least one of the second conductive terminals comprising a second elastic arm, the second elastic arm comprising a second mating portion and a second end portion connected to the second mating portion, the second mating portion protruding into the mating slot;
- wherein the first insulating block defines a receiving groove, and the second end portion is received in the receiving groove; and
- wherein at least one of the first conductive terminals comprises a supporting portion extending from the first elastic arm, the supporting portion is exposed from the first insulating block, the electrical connector further comprises a supporting block located behind the supporting portion along a mating direction and abutting against the supporting portion.

2. The electrical connector according to claim 1, wherein the supporting portion is formed by bending the first elastic arm, the supporting portion comprises a first end surface arranged along the mating direction and a second end surface opposite to the first end surface, the first end surface is exposed from the first insulating block, and the supporting block abuts against the second end surface.

3. The electrical connector according to claim 2, wherein the second end surface of the supporting portion is perpendicular to the mating direction.

4. The electrical connector according to claim 1, wherein each of the first conductive terminals comprises the first elastic arm, each of the second conductive terminals comprises the second elastic arm, a plurality of the receiving grooves are provided and arranged side by side along a transverse direction perpendicular to the mating direction, the first wall portion defines a plurality of first positioning grooves in communication with the mating slot, the first positioning grooves are arranged side by side along the transverse direction, and the first end portion is received in a corresponding first positioning groove.

5. The electrical connector according to claim 4, wherein the first insulating block comprises a plurality of partitions arranged at intervals along the transverse direction; and wherein two adjacent second elastic arms in the transverse direction are separated by one partition located between the two second elastic arms.

6. The electrical connector according to claim 5, wherein the first insulating block further comprises a partition wall extending along the transverse direction, the plurality of partitions are connected to the partition wall and extend along the mating direction, one side of the supporting block abuts against the supporting portion, and the other side of the supporting block abuts against the partition wall.

7. The electrical connector according to claim 4, wherein the first mating portions are arranged in a first row, the second mating portions are arranged in a second row parallel to the first row; and wherein the first elastic arm and the second elastic arm are aligned and arranged along the mating direction.

8. The electrical connector according to claim 1, wherein the first conductive terminals are insert-molded with the first insulating block, the second conductive terminals are insert-molded with the second insulating block, the first terminal module and the second terminal module are assembled with each other along an installation direction parallel to the mating direction, the first insulating block and the second insulating block are provided with a groove and a protrusion which are mutually matched with each other so as to prevent the first terminal module and the second terminal module from being separated from each other in a direction perpendicular to the mating direction.

9. The electrical connector according to claim 8, wherein a plurality of the grooves are provided, and at least two of the grooves are L-shaped with opposite directions; and wherein a plurality of the protrusions are provided, and at least two of the protrusions are L-shaped in opposite directions.

10. The electrical connector according to claim 1, wherein each first conductive terminal comprises a first fixing tail, each second conductive terminal comprises a second fixing tail, the first fixing tail and the second fixing tail are soldered or welded to a circuit board, and the circuit board is perpendicular to the mating direction.

11. The electrical connector according to claim 1, further comprising:
- a third terminal module, comprising a third insulating block and a plurality of third conductive terminals fixed to the third insulating block, at least one of the third conductive terminals comprising a third elastic arm, the third elastic arm comprising a third mating portion, the third mating portion protruding into the mating slot to be electrically connected with a mating module; and a fourth terminal module, comprising a fourth insulating block and a plurality of fourth conductive terminals fixed to the fourth insulating block, at least one of the fourth conductive terminals comprising a fourth elastic arm, the fourth elastic arm comprising a fourth mating portion, the fourth mating portion protruding into the mating slot to be electrically connected with the mating module;

wherein the first terminal module and the second terminal module constitute a first module, the third terminal module and the fourth terminal module constitute a second module, the first mating portion and the second mating portion protrude into the mating slot along a first direction, and the third mating portion and the fourth mating portion protrude into the mating slot in a second direction opposite to the first direction.

12. The electrical connector according to claim 1, wherein the supporting block and the first insulating block are integrally formed.

13. The electrical connector according to claim 1, wherein the supporting block is arranged separately from the first insulating block, and the supporting block is fixed to the first insulating block.

14. The electrical connector according to claim 1, further comprising a metal shell enclosing the insulating body, the metal shell comprising a top wall, a bottom wall and two side walls, the top wall comprising a raised portion and a cavity located in the raised portion;

wherein the second wall portion further comprises a guiding bar protruding into the cavity.

15. The electrical connector according to claim 14, wherein the guiding bar extends along the mating direction.

* * * * *